United States Patent Office 3,579,302
Patented May 18, 1971

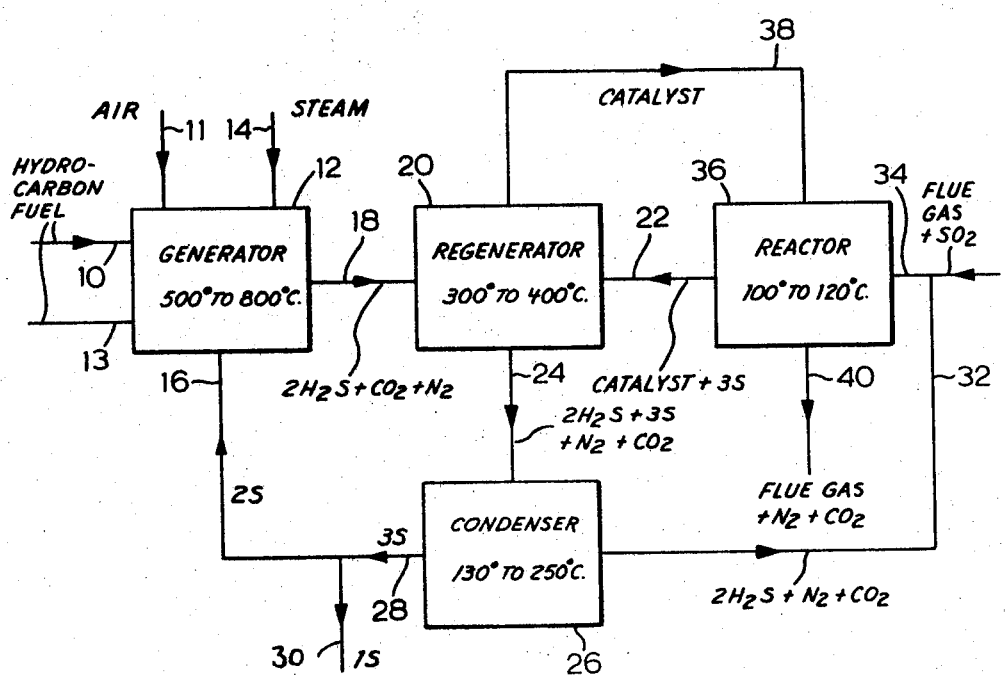

3,579,302
METHOD OF FORMING SULFUR FROM SO₂-CONTAINING GASES
Verner B. Sefton, Toronto, Ontario, Canada, assignor to Ontario Research Foundation, Sheridan Park, Ontario, Canada
Continuation-in-part of application Ser. No. 722,719, Apr. 19, 1968. This application June 25, 1969, Ser. No. 836,501
Int. Cl. C01b *17/04*
U.S. Cl. 23—226   9 Claims

ABSTRACT OF THE DISCLOSURE

Hydrogen sulphide-containing gases used to react with sulphur dioxide in a waste effluent gas stream to thereby produce sulphur is generated by reaction between sulphur, a hydrocarbon fuel and steam at high temperatures. The high temperatures necessary for the reaction of sulphur, hydrocarbon fuel which may be the same as or different from that used to form the hydrogen sulphide-containing gases. The sulphur used to form the hydrogen sulphide may be that formed in the reaction of the sulphur dioxide and the hydrogen sulphide-containing gases.

---

This application is a continuation-in-part of application Ser. No. 722,719 filed Apr. 19, 1968.

This invention relates to a method of removing sulphur dioxide from waste gaseous effluents.

Sulphur dioxide contained in waste gaseous effluents, such as from thermal electric generating stations and from smelting operations, is a major air pollutant. Sulphur dioxide is, in itself, injurious to health and plant vegetation, and, in addition, can cause much corrosion to exposed structural materials as a result of oxidation of sulphur dioxide in the atmosphere to sulphuric acid. In flue gases the concentration of sulphur dioxide is generally about 0.1 to 0.5% but this value is dependent upon the sulphur content of the fuel used for combustion and the combustion conditions. In smelter operations, the quantity of sulphur dioxide in the effluent gas may range from 1 to as high as 10% dependent on the quantity of sulphur in the ore and the specific mode of smelter operation.

Methods of cheaply and simply removing the sulphur dioxide from the gaseous effluents so as to reduce atmospheric pollution have been sought.

The present invention is based upon the simple reaction of sulphur dioxide with one or a mixture of the following compounds and in the presence of a catalyst: hydrogen sulphide, carbonyl sulphide and carbon disulphide. The reactions involved may be represented by the following equations:

$$SO_2 + 2H_2S \rightarrow 2H_2O + 3S$$
$$SO_2 + 2COS \rightarrow 2CO_2 + 3S$$
$$SO_2 + CS_2 \rightarrow CO_2 + 3S$$

The compound, which takes the form of a reducing gas, is added to the waste gaseous effluent upstream of the catalyst bed and the reactions take place readily at temperatures 200 to 350° C. A number of processes based on the reaction of hydrogen sulphide and sulphur dioxide in this temperature range have been proposed.

In accordance with the process of the present invention the sulphur dioxide is reacted with hydrogen sulphide or mixtures of hydrogen sulphide with carbonyl sulphide and/or carbon disulphide at temperatures between about 50° and about 500° C. or higher. The present invention will be described with particular reference to hydrogen sulphide, but it is to be understood that the term "hydrogen sulphide" includes mixtures thereof with carbonyl sulphide and/or carbon disulphide.

Where large quantities of oxygen are present in the effluent stream it is preferred to use temperatures of about 50° to 150° C., particularly about 100° to 120° C. since at higher temperatures the oxygen will preferentially oxidize the hydrogen sulphide. In addition, it is preferred to use these temperatures since many of the gaseous effluents to be treated have temperatures in this range and thus the heat requirement is reduced. Further, operating in this temperature range avoids the necessity of coling the effluent to, say, 50° C. if this were the desired reaction temperature. At these temperatures, the sulphur produced by the reaction between the sulphur dioxide and the hydrogen sulphide is deposited on the catalyst. The catalyst gradually loses its efficiency as more sulphur is deposited and it is necessary to regenerate the catalyst by removing the sulphur therefrom. Many different catalysts may be employed, for example, cobalt molybdate on almuina, iron oxide on alumina, the noble metals such as palladium, platinum and rhodium on various catalyst supports, or promoted iron oxide, but it is preferred to use activated alumina or bauxite.

The reaction between hydrogen sulphide and sulphur dioxide is an exothermic reaction. Carrying out the reaction on a fixed bed catalyst heats up the catalyst and this heat may raise the temperature above the preferred range, depending on the quantity of sulphur dioxide present in the effluent gas stream. More heat is generated, the higher the concentration of sulphur dioxide. Under these circumstances, the temperature of the catalyst bed may be controlled by using a fluidized bed and removing the heat of reaction by heat exchange, spraying water onto the catalyst, including water in the gas stream, or by employing a dilute solid catalyst flow reaction in which efficient heat exchange with a cooling medium can be achieved.

Where higher temperatures above 250° C. are employed for the sulphur dioxide-hydrogen sulphide reaction, then sulphur is not deposited on the catalyst but continues in the gas stream as sulphur vapour. The operation of the process at this higher temperature thus has the advantage that sulphur is not deposited on the catalyst. It does, however, suffer from the disadvantage that it cannot be employed efficiently where large quantities of oxygen (i.e. of the order of 2–20% oxygen and low concentrations of sulphur dioxide) relative to the quantity of sulphur dioxide are present because of oxidation of the hydrogen sulphide by oxygen. For low concentrations of $SO_2$ external heat is required to heat the catalyst to the reaction temperature of 250° C. or above. For high concentrations of sulphur dioxide, i.e. above about 2%, the heat of reaction of hydrogen sulphide and sulphur dioxide is such that the catalyst will be heated to the reaction temperature of 250° to 400° C. Where such high concentrations of sulphur dioxide are involved it is possible to start the reaction in the low temperature range and as the catalyst bed heats up complete it in the high temperature range.

The reaction can occur at a temperature of about 250° to 400° C., or higher, up to about 600° C., but it is preferred to use temperatures of about 300° to 400° C. As indicated above, at those temperatures oxygen present in the effluent gas stream reacts with the hydrogen sulphide in accordance with the following equations:

$$2H_2S + 3O_2 \rightarrow H_2O + SO_2$$

or $$2H_2S + O_2 \rightarrow H_2O + S$$

It is thus preferable where the higher temperatures are employed to include an excess of hydrogen sulphide equivalent to the amount of oxygen contained in the waste gas stream to ensure complete reaction of the sulphur dioxide present. Since the sulphur formed in the reaction is in the form of vapour there is no necessity to regenerate the catalyst.

The gas stream emerging from the catalyst bed and containing sulphur vapour is cooled, the sulphur thereby condensed collected as liquid or solid depending on the temperature to which the stream is cooled and the remainder of the stream vented to atmosphere.

Operation of the hydrogen sulphide-sulphur dioxide reaction at high temperatures may give rise to less than 100% conversion because of the tendency of the reaction to reverse direction at the higher temperatures. In such an instance two separate catalyst beds could be employed, one operating at high temperature and the other at low temperature, thereby giving 100% reaction of the sulphur dioxide. The sulphur produced in the high temperature reaction could be condensed prior to feed of the effluent from the high temperature reaction to the low temperature catalyst or the sulphur collected by condensation on the low temperature catalyst.

The sulphur may be recovered from the sulphur-laden catalyst produced by the use of a low temperature (i.e., about 100° to 120° C.) reaction or in the high temperature-low temperature reaction just described between sulphur dioxide and hydrogen sulphide in a number of ways.

Thus, the catalyst may be heated to a temperature around 300° to 350° C. and the sulphur removed as vapour in an inert gas stream. Alternatively the catalyst may be heated to a temperature above the boiling point of sulphur and the sulphur is thereby driven off as vapour. Solid or liquid sulphur are recovered on cooling the vapour or inert gas stream. The sulphur may then be collected as such or used to generate hydrogen sulphide for use in reacting with sulphur dioxide by reaction with hydrogen. Hydrogen reacts with sulphur in the presence of certain catalysts at temperatures of about 400° to 500° C. to produce hydrogen sulphide almost quantitatively.

A further method of removing sulphur from the catalyst is the proposal to strip the sulphur with hydrogen at a temperature around 450° to 500° C. or higher, thereby forming hydrogen sulphide directly.

Further, it has been proposed in our British patent application No. 1741/68, filed Jan. 11, 1968, to use carbon monoxide to strip the sulphur at a temperature of about 250° to 500° C. thereby producing carbonyl sulphide which is subsequently hydrolysed to hydrogen sulphide at temperatures around 200° to 350° C. in the presence of a catalyst.

Since the reaction of the sulphur dioxide and hydrogen sulphide produces three equivalents of sulphur for each two equivalents of hydrogen sulphide, only two equivalents of the sulphur need be reacted to form hydrogen sulphide and one equivalent of sulphur is generally retained as by-product and may be sold. Thus:

$$SO_2 + 2H_2S \rightarrow 3S + 2H_2O$$

$$2H_2 + 3S \rightarrow 2H_2S + S$$

$$2CO + 3S \rightarrow 2COS + S$$

or $$2COS + 2H_2O \rightarrow 2H_2S + 2CO_2$$

The sulphur recovered from a high temperature (i.e., above about 250° C.) reaction between sulphur dioxide and hydrogen sulphide may also be used to generate hydrogen sulphide in similar manner by reaction with hydrogen or carbon monoxide.

It has been found that if an actively reducing gas, such as hydrogen, carbon monoxide or hydrogen sulphide, is used to strip the sulphur from a catalyst, such as alumina, then the catalyst is substantially completely regenerated, and may be utilized to catalyze further reactions between hydrogen sulphide and sulphur dioxide, whereas if a heated inert gas stream, such as a stream of nitrogen or of flue gas, it used to strip the sulphur from the catalyst, then the catalyst is not completely regenerated, and its effectiveness in subsequent hydrogen sulphide-sulphur dioxide reactions is reduced.

While applicant does not wish to be bound by any theory to explain this effect, it is theorized that there may be present on the surface of the catalyst various higher oxides of sulphur, such as sulphur trioxide, sulphates and thiosulphates formed as by-products and these materials attack the surface of the catalyst during the regeneration step. An actively reducing gas would reduce any higher oxides of sulphur to sulphur or sulphides, thereby minimizing any attack by such sulphur oxides on the surface of the catalyst during regeneration.

In accordance with the present invention, the hydrogen sulphide used to react with the sulphur dioxide is generated by reaction between hydrocarbon fuels, steam and sulphur at temperatures of about 500° to 900° C., the reactants being heated to the temperature range by the combustion products of hydrocarbon fuel. The reaction could equally be carried out in a two-stage reaction first forming carbon disulphide and hydrogen sulphide and then hydrolysing the carbon disulphide to form carbon dioxide and more hydrogen sulphide. These reactions are illustrated by the following equations with reference to methane:

(a) One-step:

$$CH_4 + 2S_2 + 2H_2O \rightarrow CO_2 + 4H_2S$$

(b) Two-step:

$$CH_4 + 2S_2 \rightarrow CS_2 + 2H_2S$$

$$CS_2 + 2H_2O \rightarrow CO_2 + 2H_2S$$

The reaction of a hydrocarbon fuel, especially methane, with sulphur is a well known method of preparing carbon disulphide.

The hydrocarbon fuel may be any of the well known hydrocarbon fuels such as natural gas, naphtha gases and residual oils, the proportions of sulphur and steam being adjusted to suit the particular reactant, i.e.:

$$CH_4 + 2S_2 + 2H_2O \rightarrow CO_2 + 4H_2S$$

$$C_3H_8 + 5S_2 + 6H_2O \rightarrow 3CO_2 + 10H_2S$$

$$1/n(CH_2)_n + 1\tfrac{1}{2}S_2 + 2H_2O \rightarrow CO_2 + 3H_2S$$

The choice of hydrocarbon fuel is dependent upon the availability of various fuels in various areas. Hydrocarbon fuels other than natural gas do have the advantage that they require a lower temperature of reaction to produce hydrogen sulphide.

It is not necessary that there be complete conversion of the hydrocarbon to hydrogen sulphide since intermediate products such as carbonyl sulphide and carbon disulphide also react with sulphur dioxide in the manner indicated above. Thus, mixtures of reducing gases consisting mainly of hydrogen sulphide and containing carbonyl sulphide and carbon disulphide may be used to reduce the sulphur dioxide to sulphur.

The reaction between the hydrocarbon fuel and the sulphur and steam can take place between about 500° and 900° C. A catalyst is preferably used, but is not essential. The presence of a catalyst, however, allows the use of lower temperatures. A number of materials may be employed as catalyst such as activated alumina, silica gel, zeolites and iron sulphides.

When the hot hydrogen sulphide gas is formed, this can be used to strip the sulphur deposited on the catalyst in the low temperature reaction between sulphur dioxide and hydrogen sulphide. The resultant mixture of sulphur vapour and hydrogen sulphide is cooled and the sulphur recovered. The hydrogen sulphide gas free from sulphur is then used to react with the sulphur dioxide. It is preferable to use the hydrogen sulphide in this way since the available heat from the synthesis of the hydrogen sulphide is efficiently utilized.

The sulphur recovered may be, and is preferably, used in the generation of the hydrogen sulphide from the hydrocarbon fuel. Since only two-thirds of the sulphur recovered is necessary to generate the required quantitative amount of hydrogen sulphide, the remaining third may be sold as valuable by-product.

Further, the sulphur recovered from the high temperature reaction of sulphur dioxide and hydrogen sulphide may be, and preferably is, used to generate the hydrogen sulphide.

While the reactions producing the hydrogen sulphide from hydrocarbon fuels, steam and sulphur, whether in a one-step or two-step operation, are exothermic, the large amount of heat required to heat the reactants to 500° to 900° C. is such that there is a net requirement for heat input. In order to provide for efficient operation of the overall process the necessary heat is produced in accordance with the present invention by combustion of hydrocarbon fuel. In a preferred operation, hydrocarbon fuel and air are combusted in stoichiometric amounts and then sulphur, additional fuel and the balance of water requirement not produced from fuel combustion are injected into the hot combustion gases. The resultant mixture is next fed to a reactor preferably containing catalyst. The reducing gas produced by such a reaction of hydrocarbon fuel, sulphur and steam generally consists of 30 to 80% hydrogen sulphide, 10 to 30% carbon dioxide, 5 to 20% water and the balance nitrogen. The precise composition depends on the fuel source, heat losses and reactor temperature. The hydrocarbon fuel used to form the combustion products may be the same or different from that reacted with the sulphur and steam.

As indicated above, the hot reducing gas may be used to strip sulphur deposited on a catalyst by a low temperature reaction of sulphur dioxide and hydrogen sulphide, thereby efficiently utilizing the heat available from the synthesis of the reducing gas and efficiently regenerating the catalyst. If supplemental heat is required to heat the catalyst to the stripping temperature, this may be provided by injection of additional combustion gases, either in the synthesis or stripping stage.

A further benefit of utilizing combustion gases, in accordance with the present invention, to heat the hydrocarbon fuel and sulphur directly to the reaction temperature for the synthesis of hydrogen sulphide is that the volume of inert gas available for regeneration of the catalyst used in the low temperature reaction of sulphur dioxide and hydrogen sulphide is greatly increased. This increase in the volume of inert gas reduces the temperature to which it is necessary to heat the catalyst in order to vaporize the sulphur. This has the effect of both providing heat economy and also increasing the active life of the catalyst.

The catalyst which is recovered after stripping the deposited sulphur therefrom will have a temperature of about 300° to 450° C. and it is preferred to cool the catalyst to the required temperature (i.e., about 100° to 120° C. in the preferred embodiment of the low temperature reaction) using air and employing the air, heated by passage through the catalyst as the air in the above combustion process. This mode of heating the air and cooling the catalyst gives rise to further thermal economy.

Where the waste sulphur dioxide-containing gas contains quantities of sulphur dioxide about 1 to 20% and with large quantities of oxygen, i.e., about 5 to 15%, then this sulphur dioxide may be used to generate the hydrogen sulphide by reaction over a catalyst at about 500° to 800° C. Thus, in reaction with methane:

$$3CH_4 + 4SO_2 \rightarrow 3CO_2 + 4H_2S + 2H_2O$$

The sulphur dioxide-containing stream is preferably added in sufficient quantity to provide the amount of oxygen necessary to react with the required amount of hydrocarbon to produce the combustion product which heats the sulphur dioxide and more fuel to the reaction temperature. Operation in this manner has the advantage of reducing the amount of sulphur which must be utilized in generation of the hydrogen sulphide per ton of sulphur recovered.

The invention will now be further described by way of example with reference to the accompanying drawing which is a flow sheet.

A stream of a hydrocarbon fuel such as methane and a stream of air are fed respectively through lines 10 and 11 to a generator 12 containing a catalyst. The air and hydrocarbon fuel react forming combustion products and the heat of reaction causes the temperature within the generator to rise around 500°–800° C. When the generator attains this temperature, a separate stream 13 of a hydrocarbon fuel such as natural gas is fed to the generator 12 containing a catalyst. The air and hydrocarbon fuel are continued to be fed to the generator through lines 10 and 11 to form combustion products in order to maintain the reaction temperature. Also fed to the generator 12 are stream through line 14 and recycled sulphur through line 16. The hydrocarbon fuel, the sulphur and the steam react to form hydrogen sulphide and carbon dioxide. The reaction products consisting of hydrogen sulphide, carbon dioxide, nitrogen from the air and any excess steam and sulphur vapour are fed through line 18 to a regenerator 20. In the regenerator, which operates at a temperature around 250° to 450° C., the reaction products contact a sulphur laden catalyst fed through line 22. The hot gaseous reaction products strip the sulphur from the catalyst and the resulting gaseous stream containing sulphur vapour is fed through line 24 to a condensor 26. In the condensor, the gaseous stream is cooled to a temperature of about 130° to 250° C. and the sulphur deposited from the stream collected as liquid. The sulphur passes from the condensor through line 28 and is split into two parts. About two-thirds of the quantity of sulphur recovered is fed through line 16 to the generator 12 and the remaining third recovered through line 30 and cooled further to solid sulphur which is a saleable by-product. The gas stream from the condensor, consisting of hydrogen sulphide, carbon dioxide, nitrogen and any excess steam in approximately the same proportions as in line 18, is fed through line 32 to a sulphur dioxide containing effluent gas stream flowing in line 34. The resultant mixture is fed to a reactor 36 containing a catalyst recycled through line 38 from regenerator 20. The catalyst is air-cooled by the stream of air ultimately fed to the generator 12 through line 11 during the recycle through line 38 to the temperature required in the reactor 36. The reactor operates at a temperature about 100° to 120° C. In the reactor, the hydrogen sulphide reacts with the sulphur dioxide producing sulphur which is deposited on the catalyst. The flue gases and the carbon dioxide and nitrogen are vented to atmosphere through line 40. The spent sulphur laden catalyst is fed through line 22 to regenerator 20. It is preferred to operate the withdrawal, regeneration and return of the catalyst in a continuous manner.

The invention is further illustrated by the following examples. All percent by volume unless otherwise stated.

EXAMPLE I

A series of reactions were carried out utilizing various catalysts to produce hydrogen sulphide from a gas stream containing 7% methane, 21% sulphur (as $S_2$), 29% steam and 43% nitrogen. This stream was fed at a rate of 700 ml./min. over a bed of the catalyst held at various temperatures. The conversion of methane to $H_2S$ was determined in each case. It was also found that the quantity of carbonyl sulphide and carbon disulphide produced in each case was less than 1% of the amount of $H_2S$.

The results are summarized in the following Table I.

TABLE I

| Catalyst | Temp., °C. | Percent CH₄ reacted with S→H₂S |
| --- | --- | --- |
| Alcoa H.151 activated Al₂O₃ | 750 | 93 |
| Alcoa F-1 activated Al₂O₃ | 730 | 95 |
| Copper on activated Al₂O₃ (Harshaw Cu 0803) | 760 | 95 |
| Al₂O₃ "firebrick" | 800–840 | 95 |
| Empty tube | 810 | 95 |

EXAMPLE II

A further series of reactions were carried out in manner similar to that described in Example I utilizing various catalysts to produce hydrogen sulphide from a gas stream containing 11% methane, 33% sulphur (as $S_2$), 45% steam and 11% nitrogen. The stream was fed at a rate of 450 ml./min. over a bed of the catalyst. The conversion of methane to $H_2S$ was determined in each case. Again it was found that the quantity of carbonyl sulphide and carbon disulphide produced in each case was less than 1% of the amount of $H_2S$.

The results are summarized in the following Table II.

TABLE II

| Catalyst | Temp., °C. | Percent CH₄ reacted with S→H₂S |
| --- | --- | --- |
| Alcoa H.151 activated Al₂O₃ | 730 | 95 |
| Al₂O₃ "firebrick" | 760 | 95 |

EXAMPLE III

A gas stream containing 3% propane, 22% sulphur, 30% steam and 45% nitrogen was fed over a bed of catalyst at a rate of 670 ml./min. at 570° C. The catalyst employed was Alcoa H.151 activated alumina. Analysis of the product revealed the percent production of hydrogen sulphide from propane and sulphur to be 95%.

EXAMPLE IV

A gas stream containing nitrogen, sulphur, steam and fuel oil was fed at a rate of 300 ml./min. nitrogen, 150 ml./min. sulphur, 200 ml./min. steam and sufficient fuel oil to constitute an excess over sulphur over an Alcoa H.151 activated alumina catalyst operating at a temperature of 630° C. Analysis of the product revealed the percent product of hydrogen sulphide from the fuel oil and sulphur to be in excess of 90%. Analysis of the hydrogen sulphide revealed the content of carbonyl sulphide and carbon disulphide to be less than 5%.

EXAMPLE V

This example illustrates the applicability of the reaction to effluent streams containing large quantities of sulphur dioxide.

A gas stream consisting of 60% nitrogen, 20% methane and 20% sulphur dioxide was fed at a rate of 500 ml./min. over an Alcoa H.151 activated alumina catalyst operating at a temperature of 690° C. The sulphur dioxide was 100% converted to hydrogen sulphide.

EXAMPLE VI

A gas mixture consisting of 0.2% sulphur dioxide, 0.4% hydrogen sulphide, 4% oxygen, 14% carbon dioxide, 7% water and the balance nitrogen was passed into contact with 40 gms. of a fixed catalyst bed of Alcoa F-1 alumina having particle sizes −8 +14 mesh at a temperature of 110° C. The catalyst bed gradually cooled to 100° C. The gas mixture without the hydrogen sulphide was one such as is obtained from a thermal power station burning coal or oil. The gas mixture was flowed at a rate of 10,000 cc./min. over the catalyst bed until a loading of about 38.5% by weight of sulphur on the catalyst had been achieved after about 4 hours.

A gas mixture consisting of 10.3% methane, 4.2% carbon dioxide, 22.7% sulphur vapour, 30% steam and the balance nitrogen was fed at a rate of 720 cc./min. over an Alcoa H-151 alumina catalyst operating at a temperature of 730° C. This gas mixture is representative of one obtained when part of the methane is combusted and the combustion products used to heat the reactants to 730° C. The resulting gas mixture after reaction on the catalyst consisted of 14.5% carbon dioxide, 41.2% hydrogen sulphide, 1.1% sulphur, 9.4% steam, less than 1% of each of carbonyl sulphide and carbon disulphide and the balance nitrogen, representing a better than 99% conversion of methane to hydrogen sulphide.

This gas mixture was then passed at a rate of 720 cc./min. over 30 gms. of the loaded F-1 catalyst. The catalyst was held at a temperature of about 350° C. and all the sulphur was removed from the catalyst in about 12 minutes.

After stripping the sulphur from the catalyst it was cooled to around 100° C. and used to react more sulphur dioxide and hydrogen sulphide. The sulphur vapour was recovered from the hydrogen sulphide stream and part used to generate more hydrogen sulphide. The hydrogen sulphide after removal of the sulphur was used to react with the sulphur dioxide.

EXAMPLE VII

A gas stream consisting of 5% sulphur dioxide, 5% oxygen, 5% carbon dioxide, 2% water, 10% hydrogen sulphide and the balance nitrogen was passed over a fluidized bed of 30 gms. of Alcoa F-3 activated alumina catalyst having a particle size −60 +80 mesh at a rate 2000 cc./min. The gas stream without the hydrogen sulphide was one such as is obtained in smelting operations. The catalyst bed initially had a temperature of 80° C. and the temperature of the bed was controlled during the reaction to within the range 80–110° C. by the fluidization of the bed and cooling the reactor with air. The reaction was continued until the bed had a sulphur loading of 38.5% by weight during which time about 95% of sulphur dioxide fed was removed.

A gas mixture consisting of 10.3% methane, 4.2% carbon dioxide, 22.7% sulphur vapour, 30% steam and the balance nitrogen was fed at a rate of 138 cc./min. over a 13X molecular sieve catalyst operating at a temperature of 630° C. The gas mixture was one such as is obtained by combusting part of the methane and using the combustion products to heat the reactants to 630° C. The gas mixture after reaction on the catalyst consisted of 14.5% carbon dioxide, 41.2% hydrogen sulphide, 1.1% sulphur vapour, 9.4% steam, less than 1% each of carbonyl sulphide and carbon disulphide and the balance nitrogen representing a better than 99% conversion of methane to hydrogen sulphide.

This gas mixture was then passed at a rate of 138 cc./min. over 6.7 gms. of the loaded F-3 alumina catalyst. The catalyst was held at a temperature of about 355° C. and all the sulphur was removed from the catalyst in about 15 minutes.

After stripping the sulphur from the alumina catalyst it was cooled to around 80° C. and used to react more sulphur dioxide and hydrogen sulphide. The sulphur vapour was recovered from the hydrogen sulphide stream and part used to generate more hydrogen sulphide. The hydrogen sulphide stream after removal of the sulphur was used to react with the sulphur dioxide.

EXAMPLE VIII

This example illustrates the economy of the process of the invention.

A gas stream consisting of 15.2% methane, 22.3% sulphur as $S_2$, 22.3% steam, 32% nitrogen and 8% oxygen was provided. Part of the methane was combusted by the oxygen to give a gas stream consisting of 11.2% methane, 22.3% sulphur as $S_2$, 30.5% steam, 32% nitrogen and 4% carbon dioxide. This stream was fed to a generator operating at 730° C. by virtue of the heat produced by the combustion of the methane. The generator contained an Alcoa F–1 catalyst and hydrogen sulphide was generated in accordance with the equation:

$$\tfrac{1}{2}CH_4 + S_2 + H_2O \rightarrow \tfrac{1}{2}CO_2 + 2H_2S$$

The resulting gas stream consisting of 8.3% steam, 32% nitrogen, 15.2% carbon dioxide and 44.5% hydrogen sulphide was fed to a regenerator containing an Alcoa F–1 alumina catalyst loaded with about 36% w./w. sulphur and the sulphur was stripped from the catalyst by the gas stream at a temperature of about 350° C. The sulphur loaded alumina catalyst was passed to the regenerator from a reactor operating at a temperature of about 100° C. wherein sulphur dioxide in an effluent gas stream containing 1% sulphur dioxide such as a flue gas or smelter gas was reacted with the stoichiometric quantity of hydrogen sulphide to satisfy the equation:

$$2H_2S + SO_2 \rightarrow 3S + 2H_2O$$

The sulphur stripped from the catalyst after condensation from the gas stream was divided so that two-thirds of the sulphur was used to generate the hydrogen sulphide and the remaining third was recovered as saleable by-product.

The gas stream obtained after condensation of sulphur therefrom at about 125–250° C. was then used to react with the sulphur dioxide. The catalyst from which the sulphur was removed was returned to the hydrogen sulphide-sulphur dioxide reactor.

The various heat requirements were as follows:

(a) Synthesis of hydrogen sulphide:

|  | ΔH/gm. mole, Kcals. |
|---|---|
| $\tfrac{1}{2}CH_4$ 20° C. to 730° C. | +4.5 |
| 2S liquid 130° C. to $S_2$ vapour 730° C. | +35.1 |
| $H_2O$ (steam) 130° C. to 730° C. | +3.3 |
| $\tfrac{1}{2}CH_4 + S_2 + H_2O \rightarrow \tfrac{1}{2}CO_2 + 2H_2S$ | −19.0 |
| Total | +23.9 |

The amount of combustion gas required to produce +23.9 Kcals. at 730° C.=0.18 mole $CH_4$+1.8 moles air.

The gaseous effluent from the generator was: $2H_2S$, 0.68 $CO_2$, 0.36 $H_2O$ and 1.44 $N_2$ (molar quantities).

(b) Stripping of sulphur from $Al_2O_3$:

|  | ΔH/gm. mole, Kcals. |
|---|---|
| 3S (adsorbed) 100° C. to ⅜ $S_8$ (gas) 350° C. | +12.8 |
| 2.65 $Al_2O_3$ 100° C. to 350° C. | +17.0 |
| Total | +29.8 |

(c) Heat available from effluent of $H_2S$ generator:

|  | ΔH/gm. mole, Kcals. |
|---|---|
| $2H_2S$, 0.68 $CO_2$, 0.36 $H_2O$, 1.44 $N_2$ at 730° C. to 350° C. | 16.0 |

Therefore, additional combustion required to strip S=29.8−16.0=13.8 Kcals.

The amount of combustion gas required to produce 13.8 Kcals. at 350° C. is 0.075 mole $CH_4$+0.75 mole air.

The heat losses may be assumed to be equivalent to the heat of combustion from 0.07 mole $CH_4$ and 0.7 mole air (i.e., approximately 10% of the total methane requirement).

Thus, total natural gas requirement is:

|  | Moles |
|---|---|
| Synthesis of $H_2S$ | 0.5 |
| Synthesis heat | 0.18 |
| Stripping $Al_2O_3$ | 0.075 |
| Heat losses | 0.07 |
|  | 0.83 |

This quantity is the amount required overall to synthesize 2 moles of hydrogen sulphide which in turn produces 1 mole of product sulphur, i.e., the natural gas requirement is about 20,000 cubic feet per ton of sulphur recovered.

EXAMPLE IX

A gas stream containing 1% $SO_2$, 2% $H_2O$ and 97% air, simulating a flue waste gas, to which 1% $H_2S$ was added was passed over a 10 g. sample of Alcoa F–3 activated alumina at 110° C. The efficiency of the reaction between the hydrogen sulphide and the sulphur dioxide as indicated by the percent removal of $H_2S$ was determined throughout the reaction.

When the catalyst had reached approximately its maximum capacity for sulphur, it was regenerated by passing a gas stream therethrough at about 400° C. Separate experiments were performed with nitrogen, hydrogen sulphide and a mixture of nitrogen and hydrogen sulphide.

The regenerated catalyst from each experiment then was utilized as the catalyst for further $H_2S$-$SO_2$ reactions to an approximately maximum sulphur loading. This was repeated for a number of regenerations.

The results are reproduced in the following Table III:

TABLE III

|  | Regeneration gas | S loading at >90% $H_2S$ removal g. S/100 g. $Al_2O_3$ | Final loading g. S/100 g. $Al_2O_3$ |
|---|---|---|---|
| Clean catalyst | | 38.5 | 54.2 |
| Regeneration: | | | |
| 1 | $N_2$ | 6.0 | 43.0 |
| 2 | $N_2$ | 2.0 | 26.1 |
| 3 | $H_2S$ | 12.0 | 50.3 |
| Clean catalyst | | 29.0 | 65.5 |
| Regeneration: | | | |
| 1 | $H_2S$ | 24.0 | 65.3 |
| 2 | $H_2S$ | 23.0 | 56.3 |
| 3 | $H_2S$ | 23.0 | 52.7 |
| 4 | $H_2S/N_2$ | 22.0 | 47.0 |
| 5 | $N_2$ | 5.0 | 51.9 |
| 6 | $H_2S$ | 31.0 | >37.8 |
| 7 | $H_2S$ | 25.0 | 45.4 |

These results show that high catalytic activity is maintained with a reducing gas such as hydrogen sulphide as the regeneration gas in contrast to an inert gas such as nitrogen.

Many modifications are possible within the scope of the invention.

What is claimed is:

1. A process for removing sulphur dioxide from sulphur dioxide-containing effluent gas which comprises reacting said sulphur dioxide in said effluent gas with a reducing gas comprising hydrogen sulphide in the presence of a catalyst in accordance with the equation:

$$SO_2 + H_2S \rightarrow 3S + 2H_2O$$

at a temperature between about 50° C. and about 150° C., whereby sulphur is deposited on said catalyst, combusting hydrocarbon fuel to form a combustion products stream having a temperature of about 500° to about 900° C., feeding hydrocarbon fuel, sulphur and steam into said combustion products stream to form a gas mixture, generating said reducing gas from said gaseous mixture, feeding said reducing gas into contact with said catalyst having sulphur deposited thereon, recovering said sulphur, and utilizing at least part of said recovered sulphur to form further reducing gas.

2. The process of claim 1 wherein said hydrocarbon fuel is natural gas, naphtha or residual oil.

3. The process of claim 1 wherein said reaction of hydrocarbon fuel, steam and sulphur takes place in the presence of a catalyst.

4. A process for removing sulphur dioxide from a sulphur dioxide-containing effluent gas which comprises reacting said sulphur dioxide in said effluent gas with a reducing gas comprising hydrogen sulphide in the presence of a catalyst in accordance with the equation:

$$SO_2 + 2H_2S \rightarrow 3S + 2H_2O$$

at a temperature of between about 50° C. and about 150° C., whereby sulphur is deposited on said catalyst, removing said sulphur from said catalyst by contact with said reducing gas prior to reaction with said sulphur dioxide, recovering said sulphur, forming said reducing gas by reaction of a hydrocarbon fuel, steam and at least part of said recovered sulphur at a temperature of about 500° to about 900° C., and attaining said latter temperature by combustion of hydrocarbon fuel, said reaction of hydrocarbon fuel, steam and sulphur to produce said reducing gas taking place in two steps, the first of said steps involving reacting hydrocarbon fuel with sulphur to produce carbon disulphide and subsequently hydrolysing said carbon disulphide with steam to produce said reducing gas.

5. The process of claim 1 wherein said reaction takes place at a temperature of about 100° to about 120° C.

6. A continuous process for the removal of sulphur dioxide from a sulphur dioxide-containing effluent gas stream which comprises continuously feeding said effluent gas stream together with a reducing gas comprising hydrogen sulphide or a mixture of hydrogen sulphide with at least one of carbonyl sulphide and carbon disulphide in the stoichiometric amount necessary to reduce the sulphur dioxide to sulphur into contact with a bed of catalyst operating at a temperature of about 50° to 150° C. whereby said sulphur dioxide is continuously reduced to sulphur and said sulphur is deposited on said catalyst, continuously removing catalyst having sulphur deposited thereon from said bed, continuously adding fresh catalyst to said bed, continuously combusting hydrocarbon fuel to form a combustion products stream having a temperature of about 500° to about 900° C., continuously feeding hydrocarbon fuel, sulphur and steam into said combustion products stream to form a gaseous mixture, continuously feeding said gaseous mixture into contact with a catalyst to thereby generate said reducing gas, continuously feeding said reducing gas into contact with said catalyst having sulphur deposited thereon at a temperature of from about 250° to about 450° C. whereby said sulphur is vapourized, continuously condensing said vapourized sulphur, continuously reacting approximately two-thirds of the mole quantity of the condensed sulphur with said hydrocarbon fuel and said steam to generate said reducing gas, continuously feeding said catalyst after removal of the deposited sulphur to said bed as fresh catalyst, and continuously feeding said reducing gas after contact with said sulphur-laden catalyst together with said effluent gas stream into contact with said bed of catalyst.

7. A continuous process for the removal of sulphur dioxide from a sulphur dioxide-containing effluent gas stream which comprises continuously feeding said effluent gas stream together with a reducing gas comprising hydrogen sulphide or a mixture of hydrogen sulphide with at least one of carbonyl sulphide and carbon disulphide in the stoichiometric amount necessary to reduce the sulphur dioxide to sulphur into contact with a bed of catalyst operating at a temperature of about 250° C. to about 400° C. whereby said sulphur dioxide is continuously reduced to sulphur and said sulphur is in the form of vapour, continuously condensing said sulphur, continuously combusting hydrocarbon fuel to form a combustion products stream having a temperature of about 500° to about 900° C., continuously feeding hydrocarbon fuel, sulphur and steam into said combustion products stream to form a gaseous mixture, continuously feeding said gaseous mixture into contact with a catalyst to thereby generate said reducing gas, and continuously reacting approximately two-thirds of the mole quantity of the condensed sulphur with said hydrocarbon fuel and said steam.

8. The process of claim 6 including continuously contacting said catalyst after removal of the deposited sulphur and prior to feeding to said bed as fresh catalyst with a stream of air at ambient temperature to reduce the temperature of said catalyst to a temperature within the range of about 50° to about 150° C., and continuously utilizing said air after contact with said catalyst to combust said hydrocarbon fuel.

9. The process of claim 1 wherein said reducing gas is fed into contact with said catalyst having sulphur deposited thereon at a temperature of about 250° to about 450° C.

References Cited
UNITED STATES PATENTS

| | | | |
|---|---|---|---|
| 1,955,722 | 4/1934 | Ahlquist | 23—226 |
| 1,959,151 | 5/1934 | Beekley | 23—212 |
| 2,200,928 | 5/1940 | Lindblad | 23—225 |
| 1,832,217 | 11/1931 | Joseph | 252—411 |
| 1,983,399 | 12/1934 | Ramsburg | 23—224 |
| 2,963,348 | 12/1960 | Sellers | 23—225 |
| 3,284,158 | 11/1966 | Johswich | 23—225 |
| 3,454,354 | 7/1969 | Kerr | 23—225X |

FOREIGN PATENTS

| | | | |
|---|---|---|---|
| 223,904 | 5/1957 | Australia | 23—225 |

OSCAR R. VERTIZ, Primary Examiner

G. O. PETERS, Assistant Examiner

U.S. Cl. X.R.

23—181